United States Patent [19]

Nakamura et al.

[11] 4,380,575
[45] Apr. 19, 1983

[54] METHOD FOR CONVERSION OF CHEMICAL ENERGY TO ELECTRIC ENERGY

[75] Inventors: Osamu Nakamura, Ikeda; Isao Ogino, Minoo; Teruo Kodama, Ikeda, all of Japan

[73] Assignees: Agency of Industrial Science and Technology; Ministry of International Trade and Industry, both of Tokyo, Japan

[21] Appl. No.: 320,429

[22] Filed: Nov. 12, 1981

[30] Foreign Application Priority Data

Nov. 14, 1980 [JP] Japan .............................. 55/161149

[51] Int. Cl.³ ............................................. H01M 8/00
[52] U.S. Cl. ........................................ 429/13; 429/50
[58] Field of Search ...................... 429/13, 14, 15, 16, 429/17, 50, 51, 52

[56] References Cited

U.S. PATENT DOCUMENTS 3,922,177 11/1975 Groppel ............................... 429/13
4,310,604 1/1982 Marchetti ......................... 429/13 X Primary Examiner—Charles F. LeFevour
Attorney, Agent, or Firm—Oblon, Fisher, Spivak, McClelland & Maier

[57] ABSTRACT

In the conversion of chemical energy into electric energy by the electrochemical reaction of a gaseous anodic reactant and a gaseous cathodic reactant through the medium of a heteropoly acid solid electrolyte, the life of the solid electrolyte is notably increased by passing each reactant through pools of a saturated aqueous solution of a specific salt bordering on closed empty spaces thereby allowing the reactants to acquire prescribed humidities prior to the contact thereof with the anode and cathode.

1 Claim, 13 Drawing Figures

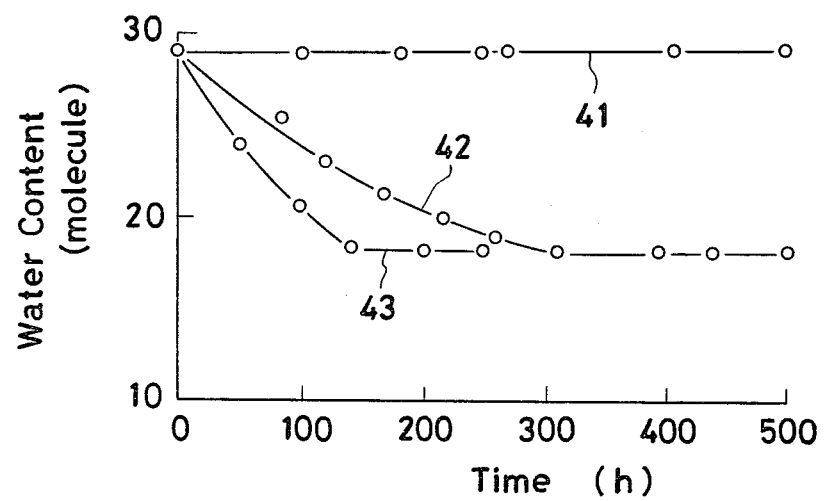
Fig_4 (A)
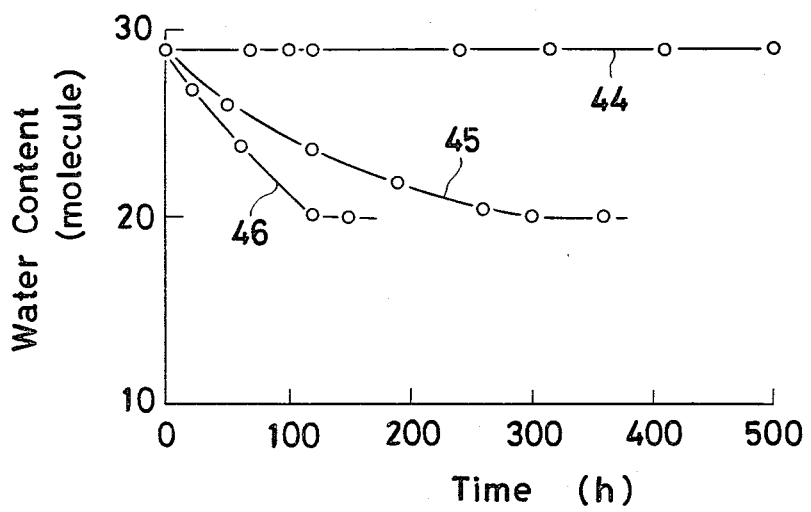
Fig_4 (B)

METHOD FOR CONVERSION OF CHEMICAL ENERGY TO ELECTRIC ENERGY

BACKGROUND OF THE INVENTION

This invention relates to a method for the conversion of chemical energy to electric energy. More particularly, this invention relates to a method for conversion of chemical energy to electric energy in a fuel cell of the type in which the conversion is accomplished through the reaction of a fuel such as hydrogen gas with an oxidizing agent such as oxygen gas through the medium of a hydrogen ion conductive solid electrolyte. Still more particularly, this invention relates to a method for the adjustment of the fuel and the oxidizing agent for the purpose of enabling the fuel cell to be stably operated continuously for a long period.

The conventional fuel cells using aqueous electrolyte solution have faults such as inconvenience of handling and leakage of liquid. To take their place, therefore, there have been developed fuel cells using solid electrolytes such as, for example, (1) a fuel cell using an oxide ion conductive solid electrode formed of a solid solution such as $ZrO_2$-$CaO$ and (2) a fuel cell using a hydrogen ion electroconductive solid electrode formed of a heteropoly acid such as 12-molybdophosphoric acid.

The fuel cell of (1), however, requires a high temperature of about 1000° C. for the solid electrolyte to acquire electrical conductivity suitable for practical applications. The materials used in this fuel cell must be able to withstand the thermal expansion and corrosion at this elevated temperature. The fuel cell, therefore, entails many problems yet to be solved in this respect.

In the fuel cell of (2), the solid electrolyte is a heteropoly acid hydrate. The electrical conductivity of this solid electrolyte, therefore, is determined by the proportion of hydration.

In order for the fuel cell using such a heteropoly acid solid electrolyte to be operated stably for a long period, it is necessary to maintain the heteropoly acid hydrate within the temperature and humidity ranges at which the crystals of the hydrate are stable.

For example, 12-molybdophosphoric acid $H_3Mo_{12}PO_{40}.29H_2O$ has been confirmed to be stable in a temperature range of 10° to 80° C. and a humidity range of 70 to 93% RH (relative humidity).

The solid electrolyte remains in contact with an anodic reactor and a cathodic reactor. It is, therefore, necessary that the temperatures and humidities of these reactants should be maintained within the ranges of stable temperature and humidity of the solid electrolyte.

The temperatures of these reactors can be maintained substantially constant when the fuel cell is operated at room temperature, for example. Nevertheless, the control of their relative humidities is no easy matter. When the absolute steam pressure is maintained constant in the neighborhood of room temperature, a change of temperature by 1° C. results in a change of as large as about 5% in relative humidity. The method adopted for regulating the humidities of the anodic reactant and cathodic reactant suitable for the fuel cell, therefore, must be such that their relative humidities are kept unaffected by any change in their temperatures.

As a method for retaining the relative humidities of given gases at constant levels, the inventors formerly proposed a method resorting to successive passage of such gases through saturated aqueous solutions of salts (Japanese Patent Application No. 38478/1979, U.S. Application Ser. No. 128150).

An object of this invention is to provide a method for enabling the fuel cell described in (2) above to be stably operated by adjusting the temperatures and humidities of the anodic reactant and cathodic reactant, i.e. the fuel and oxidizing agent, of the fuel cell by application of the afore-mentioned method involving successive passage of gases through saturated aqueous solutions of salts.

SUMMARY OF THE INVENTION

To accomplish the object described above according to the present invention, there is provided a method which, in the electrochemical reaction to be effected between an anodic reactant, i.e. hydrogen as the fuel, and a cathodic reactant, i.e. oxygen gas as the oxidizing agent, respectively in a fuel cell through the medium of a solid electrolyte, i.e. a heteropoly acid hydrate, causes the reactants to be passed through saturated aqueous solutions of selected salts held in advance in contact with closed spaces and maintained within fixed temperature ranges and then to be discharged into the closed spaces. The anodic reactant and the cathodic reactant are enabled to retain their relative humidities constant by being treated as described above. The fuel cell, therefore, can be made to operate stably for a long period by causing the temperatures and relative humidities of the reactants to remain within the temperature and humidity ranges within which the crystals of the solid electrolyte of the hydrated heteropoly acid remain stable.

BRIEF DESCRIPTION OF THE DRAWING

FIG. 4 is a diagram showing the results of the experiments of Example 1; FIG. 4(A) representing the dehydration curves obtained of 12-molybdophosphoric acid and FIG. 4(B) those obtained of 12-tungstophosphoric acid respectively.

FIG. 5(A) representing the results obtained in the atmosphere of air or oxygen and FIG. 5(B) those in the atmosphere of hydrogen.

FIG. 6(A) representing the results obtained in the atmosphere of air or oxygen and FIG. 6(B) those in the atmosphere of hydrogen.

FIG. 7(A) representing the results obtained by using 12-molybdophosphoric acid and FIG. 7(B) those obtained by using 12-tungstophosphoric acid as the solid electrolyte.

FIG. 8(A) representing the results obtained by using 12-molybdophosphoric acid and FIG. 8(B) those obtained by using 12-tungstophosphoric acid as the solid electrolyte.

DESCRIPTION OF THE PREFERRED EMBODIMENTS

This invention will be described in detail below with reference to the accompanying drawings.

Figure 1:
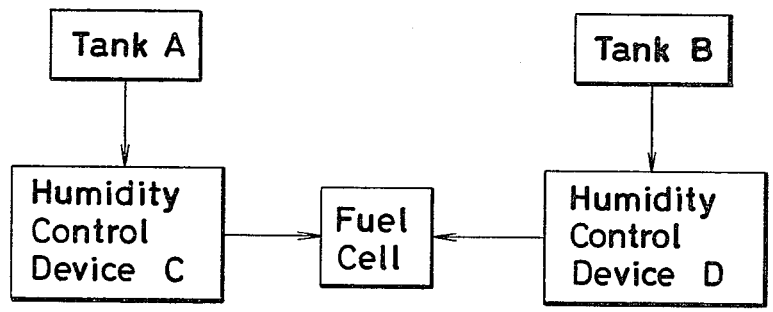
FIG. 1 is a process flow diagram illustrating the method of the present invention.

FIG. 1 represents the process flow involved in the method of the present invention. From the storage tank A is supplied an anode reactant such as, for example, hydrogen gas. From the storage tank B is supplied a cathodic reactant such as, for example, oxygen gas. These reactants are treated in the humidity control devices C, D to have their humidities adjusted, and thereafter supplied to the anode and the cathode of the fuel cell respectively.

Figure 2:
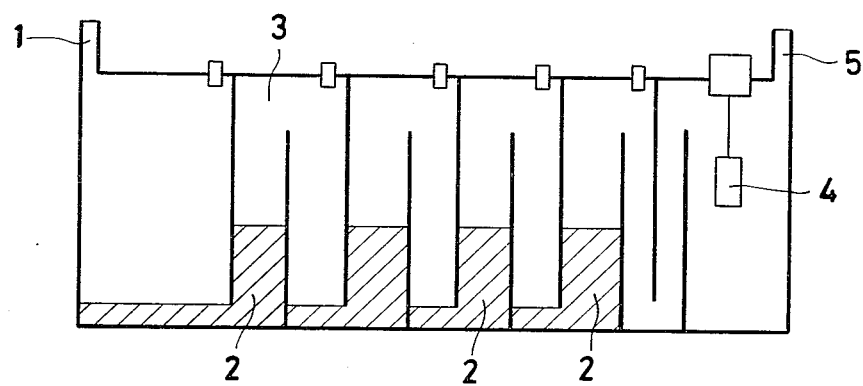
FIG. 2 is a schematic diagram illustrating one typical apparatus for working the method of this invention.

The humidity control devices C, D are constructed as illustrated in FIG. 2, for example. The reactant such as, for example, hydrogen gas supplied through the gas inlet 1 is passed through the first pool of the saturated aqueous solution of a salt 2 and introduced into the first closed space 3. Then, it is passed successively through the second, third, . . . pools of the saturated aqueous solution of a salt and introduced into the second, third, . . . closed spaces to have the humidity thereof increased to a prescribed level. Thereafter, the reactant is passed through a humidity sensor 4 and released through the gas outlet 5.

When the anodic reactant and the cathodic reactant have amply high humidities from the beginning, the number of pools of the saturated aqueous solution of said salt through which they are passed can be suitably decreased.

Figure 3:
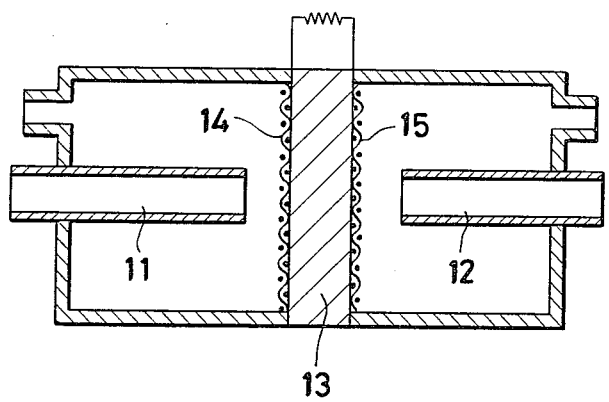
FIG. 3 is a diagram illustrating the construction of a fuel cell.

The fuel cell is constructed as illustrated in FIG. 3, for example. The anodic reactant such as, for example, hydrogen gas which has undergone humidity adjustment as described above is supplied via the hydrogen inlet pipe 11 and the cathodic reactant such as, for example, oxygen gas is supplied via the oxygen inlet pipe 12. On contact with the anode 14 such as a platinum net, the hydrogen gas gives rise to hydrogen ion $H^+$, which passes through the solid electrolyte 13 and reaches the cathode 15 such as a platinum net. At the cathode 15, the hydrogen ion and the oxide ion $O^{2-}$ released from the oxygen gas react to produce water. This movement of the $H^+$ constitutes an electric current and, consequently, effects conversion of chemical energy into electric energy.

The heteropoly acid to be used in the present invention is represented by the general formula, $H_m[X_xY_yO_z].nH_2O$ (wherein, X denotes at least one member selected from the group consisting of B, Al, Ga, Si, Ge, Sn, P, As, Sb, Bi, Se, Te, I, and transient metals, Y denotes at least one member selected from the group consisting of transient metals, provided that X and Y do not denote one same element, and m, x, y, z, and n each denote a positive numeral). Specifically, 12-molybdophosphoric acid ($H_3Mo_{12}PO_{40}.29H_2O$), 12-tungstophosphoric acid ($H_3W_{12}PO_{40}.29H_2O$), 12-molybdosilicic acid ($H_4Mo_{12}SiO_{40}.31H_2O$), and the hydrates resulting from partial dehydration of the 29 hydrates of these 12-molybdophosphoric acid and 12-tungstophosphoric acid such as, for example, 18-hydrate and 13-hydrate of 12-molybdophosphoric acid and 20-hydrate and 13-hydrate of 12-tungstophosphoric acid all answer the description. These compounds possess enough electrical conductivity to be used as the solid electrolyte in the fuel cell. They are produced by the ordinary method and are used in the form of a free acid, salt, or mixture.

It is a property of these solid electrolytes to pass hydrogen ions selectively.

Generally hydrogen gas is advantageously used as the source of hydrogen to be used as the anodic reactant but hydrogen-containing gases and metal hydrides can also be used as hydrogen sources.

As the cathodic reactant, any of the compounds which are inactive to the heteropoly acid solid electrolyte and capable of being combined with hydrogen ion can be effectively used without any particular restriction. Generally, air, oxygen, and oxidative gases such as halogen molecules such as bromine and iodine are usable.

The salt to be used for the preparation of the saturated aqueous solution can be selected from a wide range of salts. Concrete examples of such salts are $KNO_2$, KCNS, $Mg(NO_3)_2.6H_2O$, $NaBr.2H_2O$, $NaNO_2$, KI, and NaCl.

The humidities to which the reactants are to be adjusted are determined by suitably selecting the kind of the salt for the saturated aqueous solution.

Table 1 given below shows the relation between the kind of salt and the relative humidity (RH) of gas to be obtained (determined at room temperature).

TABLE 1

| Salt | % RH | Salt | % RH |
|---|---|---|---|
| $KNO_2$ | 42 ~ 46 | $NaNO_3$ | 73 ~ 80 |
| KCNS | 45 ~ 51 | $(NH_4)_2SO_4$ | 75 ~ 85 |
| $Mg(NO_3)_2.6H_2O$ | 53 ~ 58 | $NH_4Cl$ | 78 ~ 82 |
| $NaBr.2H_2O$ | 57 ~ 62 | KBr | 80 ~ 84 |
| $NaNO_2$ | 63 ~ 66 | $KHSO_4$ | 82 ~ 90 |
| $NH_4NO_3$ | 63 ~ 71 | KCl | 83 ~ 89 |
| KI | 69 ~ 74 | $KNO_3$ | 89 ~ 94 |
| NaCl | 72 ~ 80 | $NH_4H_2PO_4$ | 90 ~ 95 |
| $NaClO_3$ | 73 ~ 77 | $NaHCO_3$ | 91 ~ 96 |

When there is used a saturated aqueous solution of $KNO_2$, for example, the gas passed therethrough at room temperature acquires a relative humidity of 42 to 46% RH (the variation within this range depending upon the change in the gas temperature). When a saturated aqueous solution of $NH_4H_2PO_4$ is used, the gas passed therethrough acquires a relative humidity on the order of 90 to 95% RH.

When the saturated aqueous solution of such a salt is placed in the closed container, the humidity in the enclosed empty space above the saturated aqueous solution is constant at a fixed temperature. When a given gas is passed through this saturated aqueous solution and released into the enclosed empty space, it acquires a certain amount of humidity. As this passage through the saturated aqueous solution is repeated, the humidity of the gas approaches the prescribed humidity. Consequently, the gas eventually acquires the prescribed relative humidity substantially corresponding to the saturated aqueous solution.

Since the solubility of the metal salt is variable with the solution temperature, it is desirable to have a powder of metal salt crystals contained in the saturated aqueous solution.

When the powder is present in the aqueous solution, since the powder is dissolved into the solution in proportion to the rise of temperature, the solution always retains its saturated state despite the rise of temperature.

The water in the saturated aqueous solution is entrained by the passing gas. As the loss of water continues, the salt in the aqueous solution is deposited possibly to the extent of clogging the passage of the gas. The deposition of the salt and the consequent clogging of the passage of gas can be precluded by suitably replenishing the saturated aqueous solution with either fresh supply of the aqueous solution or water prepared for the purpose of dilution.

Although the absolute humidity in the closed empty space above the saturated aqueous solution is affected also by the temperature, no special temperature adjusting device is required actually insofar as the temperature of the empty space is maintained at room temperature. When the procedure of the method of this invention is carried out at room temperature, therefore, the anodic reactant such as hydrogen gas and the cathodic reactant such as oxygen gas can be made to acquire substantially constant levels of humidity. As a result, the heteropoly acid solid electrolyte with which the hydrogen gas and the oxygen gas come into contact can be maintained in a substantially constant humidity range. Owing to the constancy of the humidity, the amount of hydration of the heteropoly acid serving as the solid electrolyte is prevented from possible variation and the electrical conductivity is consequently maintained constant. Thus, the fuel cell can be operated stably for a period as long as 1,000 hours or more. The present invention, accordingly, serves to give a notable addition to the service life of the fuel cell heretofore held to possess a short service life.

The object of this invention is accomplished by continuously passing the anodic reactant and the cathodic reactant through the specific saturated aqueous solutions having closed empty spaces formed directly thereon at room temperature. The effect of the method of this invention is not affected by a slight change in the room temperature. This method finds absolutely no use for any special complicated apparatus. Moreover, the hydrogen gas and the oxygen gas serving as the reactants in the fuel cell can be directly fed from their cylinders.

Since the method of this invention has no use for any complicated, expensive apparatus, it requires practically no consideration to be paid to the maintenance of equipment and to the prevention of operational troubles.

Now, this invention will be described specifically below with reference to working examples.

EXAMPLE 1

In a constant temperature bath, 12-molybdophosphoric acid and 12-tungstophosphoric acid (both in the form of 29-hydrates) were tested for dehydration at 25° C. under varying relative humidities of a gas (oxygen) which had undergone humidity adjustment by use of a humidity control device constructed as illustrated in FIG. 2. The dehydration curves obtained of 12-molybdophosphoric acid are shown in FIG. 4(A) and those obtained of 12-tungstophosphoric acid in FIG. 4(B).

In FIG. 4(A), the curve 41 represents the dehydration of 12-molybdophosphoric acid obtained when the gas of 93% RH, 87% RH, or 70% RH was supplied for a long time, the curve 42 the dehydration of the same acid obtained when the gas of 65% RH was supplied similarly, and the curve 43 the dehydration of the same acid obtained when the gas of 60% RH was supplied similarly.

In FIG. 4(B), the curve 44 represents the dehydration of 12-tungstophosphoric acid obtained when the gas of 93% RH, 87% RH, or 83% RH was supplied, the curve 45 the dehydration of the same acid obtained when the gas of 80% RH was supplied, and the curve 46 the dehydration of the same acid obtained when the gas of 70% RH was supplied.

It is clear from these diagrams that the solid electrolyte remains undehydrated in the atmosphere in which the corresponding hydrates are allowed to retain proper humidities. For example, the solid electrolyte remains stable over a period of more than 1,000 hours.

EXAMPLE 2

Under varying conditions of temperature and humidity, 12-molybdophosphoric acid and 12-tungstophosphoric acid were tested for the purpose of determining the temperature and humidity ranges within which they remained stable.

Figure 5:
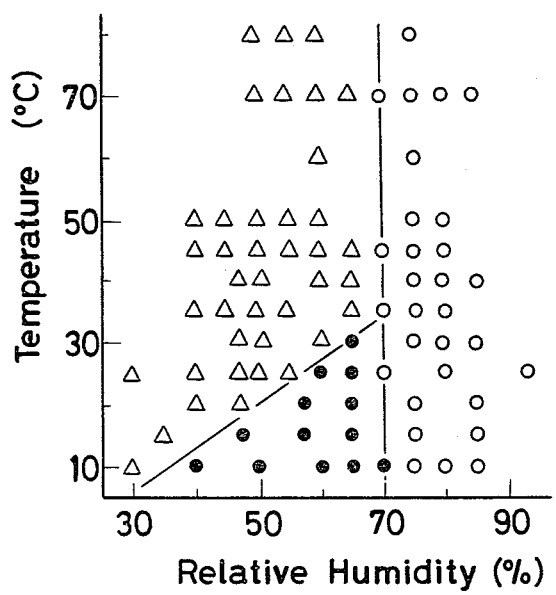
FIG. 5 is a diagram showing the temperature and humidity ranges within which 12-molybdophosphoric acid was found to remain stable in the experiments of Example 2.
Figure 6:
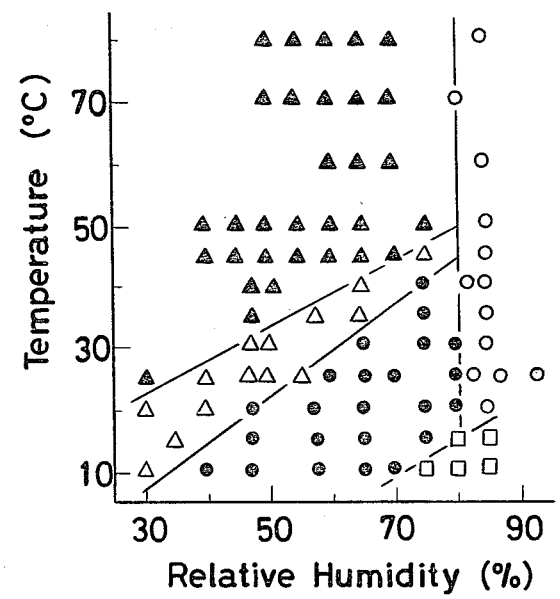
FIG. 6 is a diagram showing the temperature and humidity ranges within which 12-tungstophosphoric acid was found to remain stable in the experiments of Example 2.
Figure 5:
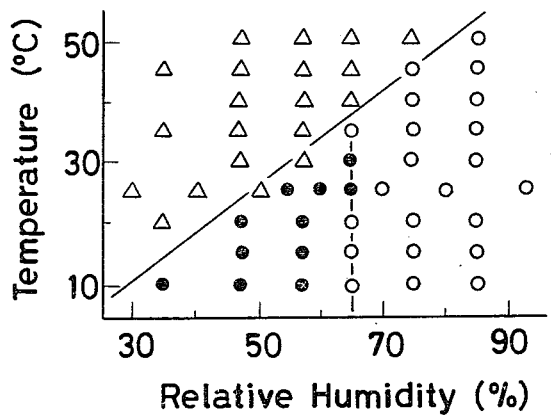
Figure 6:
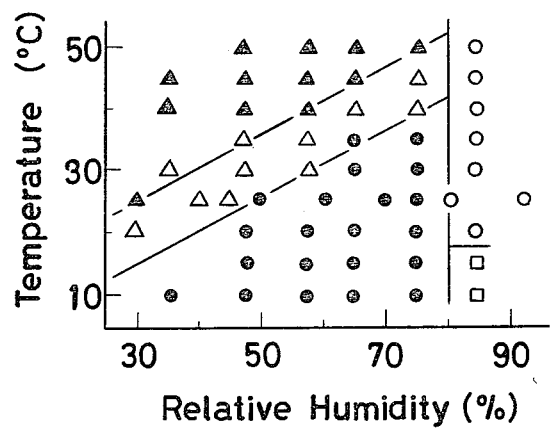

The results are shown in FIG. 5 and FIG. 6.

FIG. 5 represents the ranges obtained of 12-molybdophosphoric acid and FIG. 6 those obtained of 12-tungstophosphoric acid (A) in the atmosphere of air or oxygen gas and (B) in the atmosphere of hydrogen gas.

In FIG. 5, blank circles (o) indicate the coordinates obtained of 29-hydrate, solid circles (●) those of 18-hydrate, and blank triangles (Δ) those of 13-hydrate. In FIG. 6, blank circles (o) indicate the coordinates obtained of 29-hydrate, solid circles (●) those of 20-hydrate, blank triangles (Δ) those of 13-hydrate, solid triangles (▲) those of 6-hydrate, and blank squares (□) a low-temperature phase. When the solid electrolyte has a clear range of stable humidity as described above, it can be made to remain stably over a period of more than 1,000 hours by supplying thereto the anodic reactant and the cathodic reactant which have their humidities adjusted by use of the saturated aqueous solution of a salt capable of giving the stable range.

EXAMPLE 3

In a fuel cell constructed as illustrated in FIG. 3, varying solid electrodes were tested for electrical conductivity by supplying to the opposite surfaces of the solid electrolyte at 25° C. the oxygen gas which had the humidity thereof adjusted in advance with the saturated aqueous solution of a suitable salt. The results obtained of solid electrolyte using 12-molybdophosphoric acid of varying amounts of hydration are shown in FIG. 7(A) and those of solid electrolytes using 12-tungstophosphoric acid of varying amounts of hydration in FIG. 7(B).

It is clear from these diagrams that in all the solid electrolytes tested, no change of electrical conductivity occurred over a period of more than 1,000 hours.

Figure 7:
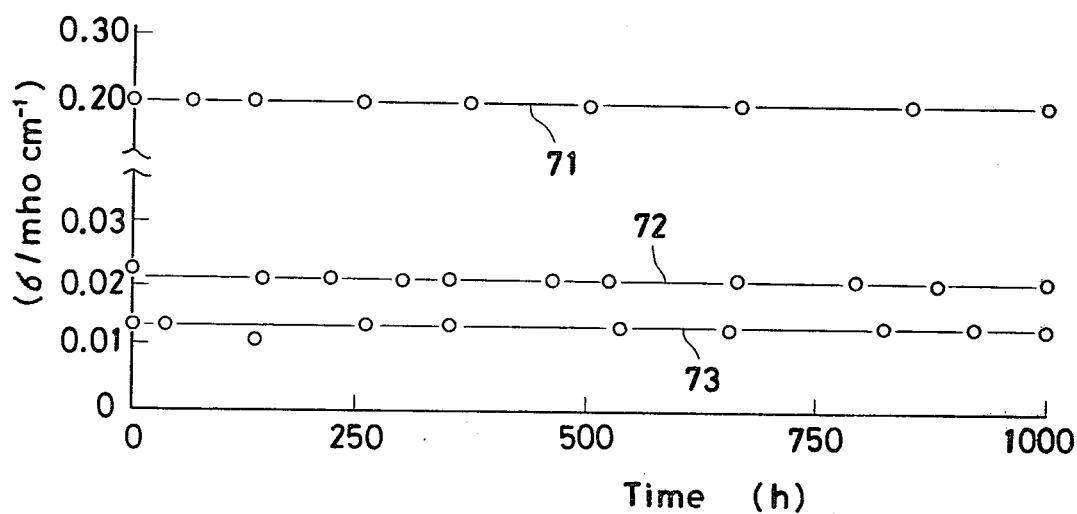
FIG. 7 is a diagram showing time-course changes of electrical conductivity under continued supply of oxygen of adjusted humidity to the solid electrolyte in the experiments of Example 3.
Figure 7:
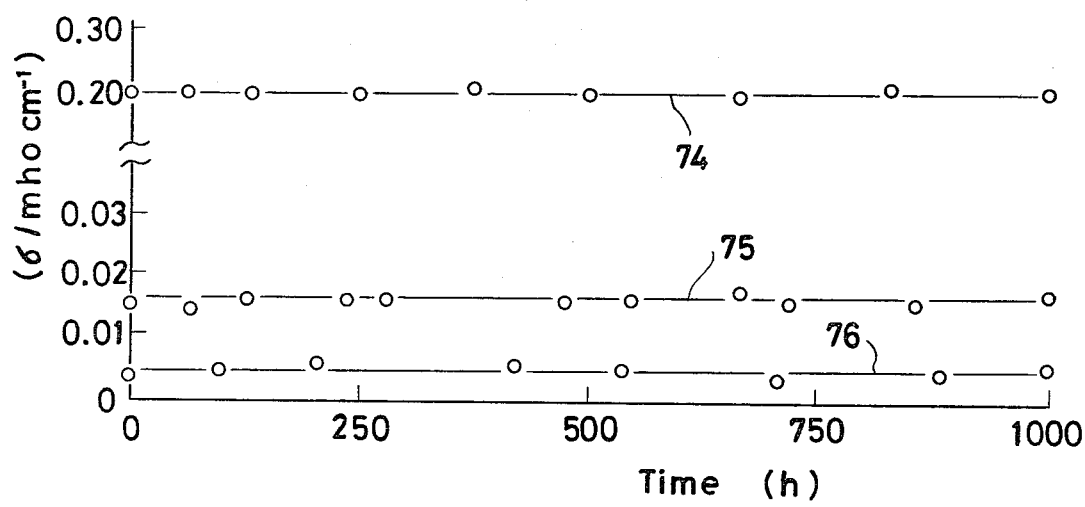

In FIG. 7(A), the curve 71 represents the results obtained of the 29-hydrate (87% RH), the curve 72 those of the 18-hydrate (65% RH), and the curve 73 those of the 13-hydrate (47% RH).

In FIG. 7(B), the curve 74 represents the results obtained of the 29-hydrate (87% RH), the curve 75 those of the 20-hydrate (65% RH), and the curve 76 those of the 13-hydrate (47% RH).

EXAMPLE 4

By following the procedure of Example 1, varying solid electrolytes were tested for possible change of the amounts of hydration.

The results using 29-hydrate of 12-molybdophosphoric acid and 29-hydrate of 12-tungstophosphoric acid are shown in FIG. 8(A) and 8(B) respectively.

Figure 8:
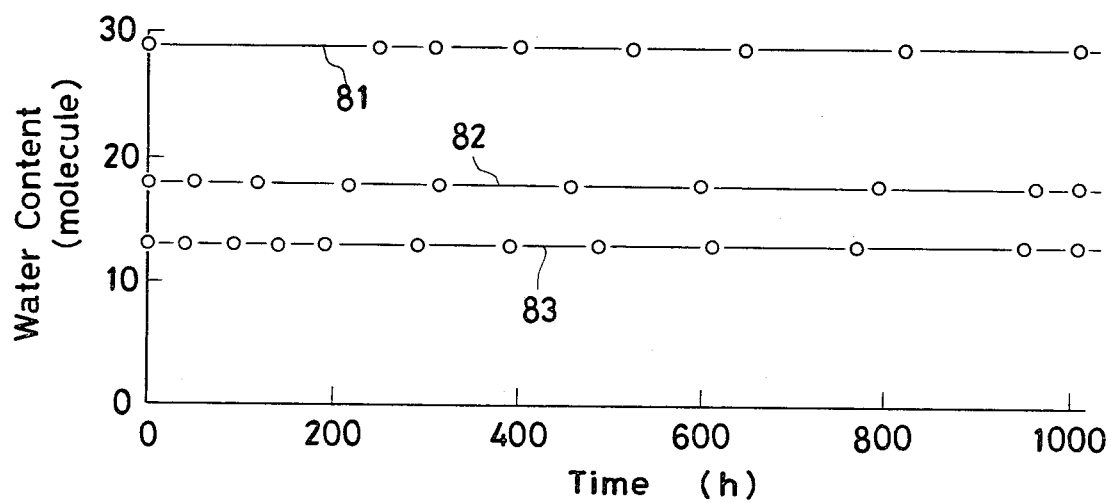
FIG. 8 is a diagram showing the time-course changes of the amount of hydration of the solid electrolyte under continued supply of oxygen of adjusted humidity to the solid electrolyte.
Figure 8:
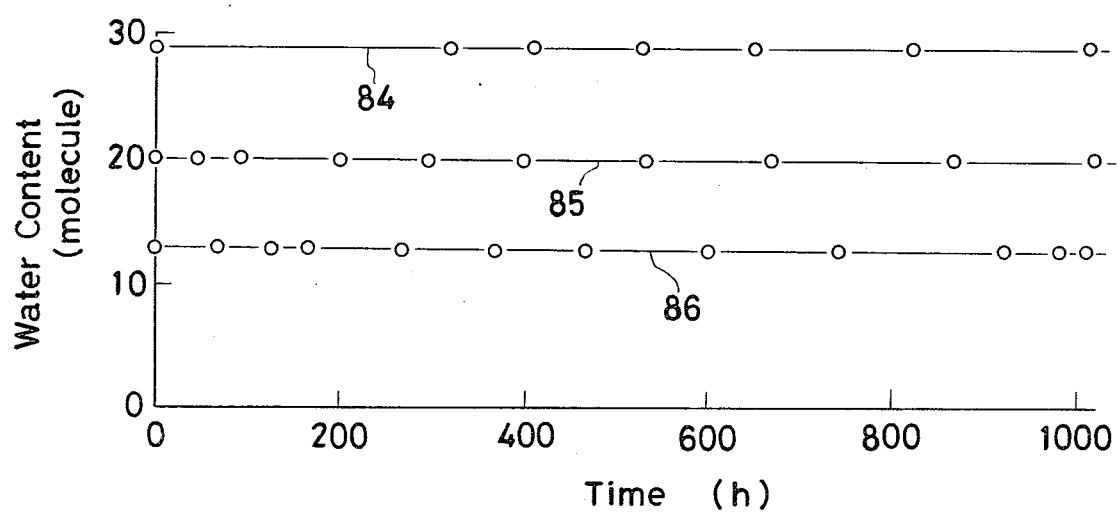

It is clear from FIG. 8 that since the oxygen gas supplied to the varying solid electrolytes had its humidity adjusted to fall within humidity range within which the particular solid electrolyte remained stable, no change of the amount of hydration was observed in any of the solid electrolytes tested at the end of 1,000 hours' test.

In FIG. 8(A) and FIG. 8(B), the curves 81 and 84 represent the results of the test using the oxygen gas having a humidity of 93% RH, the curves 82 and 85 those of the test using the oxygen gas having a humidity of 65% RH, and the curves 83 and 86 those of the test using the oxygen gas having a humidity of 47% RH.

EXAMPLE 5

In a fuel cell using a solid electrolyte of 12-tungstophosphoric acid (29-hydrate), hydrogen gas and oxygen gas both having their humidities adjusted to 85% RH with a saturated aqueous solution of potassium chloride were supplied to the solid electrolyte to effect discharge of a fixed current of 12 mA/cm$^2$. By this test, the solid electrolyte was found to have a service life of more than 1,000 hours.

What is claimed is:

1. A method for the conversion of chemical energy into electric energy by the continuous electrochemical reaction of an anodic reactant held in contact with an anode and remaining in a gaseous state at room temperature with a cathodic reactant held in contact with a cathode and remaining in a gaseous state at room temperature through the medium of a heteropoly acid solid electrolyte, which method is characterized by incorporating a step of passing said anodic reactant and cathodic reactant through pools of a saturated aqueous solution of a selected salt each bordering on a closed empty space and retained within a fixed temperature range and releasing said anodic reactant and cathodic reactant into successive closed empty spaces thereby enabling said reactants to acquire fixed relative humidities prior to the contact thereof with the anode and cathode.

* * * * *